C. H. MELVIN.
ANTISLIPPING DEVICE FOR TRACTION WHEELS.
APPLICATION FILED JAN. 18, 1913.
1,161,148.
Patented Nov. 23, 1915.
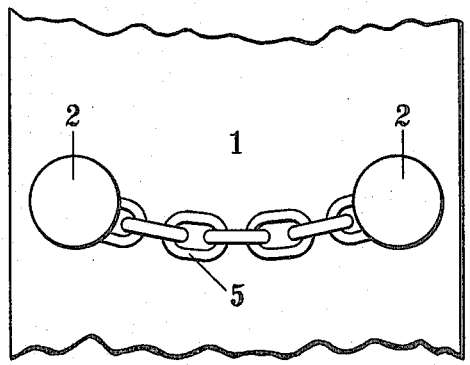
Fig. 1.
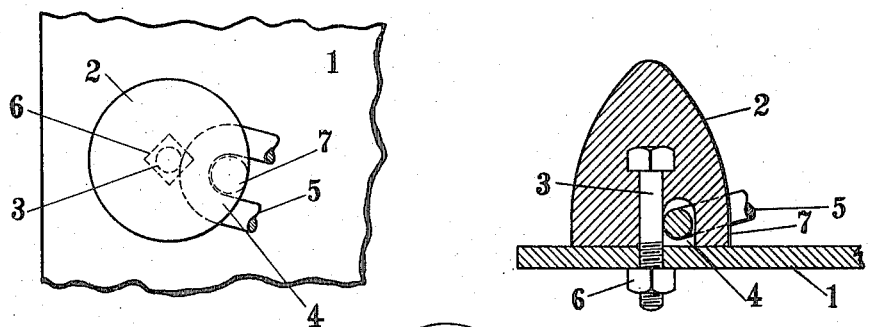
Fig. 2.    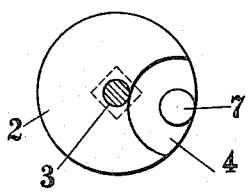    Fig. 3.
Fig. 4.
Witnesses:
Martin Peterson
W. G. Duffield
Inventor:
Charles H. Melvin
by W. C. Irdinston
Attorney

UNITED STATES PATENT OFFICE.

CHARLES H. MELVIN, OF MOLINE, ILLINOIS, ASSIGNOR TO DEERE & COMPANY, OF MOLINE, ILLINOIS, A CORPORATION OF ILLINOIS.

ANTISLIPPING DEVICE FOR TRACTION-WHEELS.

1,161,148.        Specification of Letters Patent.      Patented Nov. 23, 1915.

Application filed January 18, 1913. Serial No. 742,918.

*To all whom it may concern:*

Be it known that I, CHARLES H. MELVIN, a citizen of the United States, residing at Moline, in the county of Rock Island and State of Illinois, have invented certain new and useful Improvements in Antislipping Devices for Traction-Wheels, of which the following is a specification, reference being had therein to the accompanying drawing.

My invention relates to devices attachable to the tread of broad tired wheels, and readily detachable therefrom, particularly that class of wheels employed on power tractors or vehicles of similar description to increase the traction power and prevent slippage. My object being to provide an effective device readily applied and economical in construction.

Referring to the drawings in which similar numerals indicate similar parts, Figure 1 is a view in part of a tread surface of a tractor-wheel showing my invention thereon. Fig. 2 is an enlarged detail. Fig. 3 is a section showing the manner of securing the chain to the lugs, and Fig. 4 is a bottom plan view of one of the lugs.

Lugs of the class I have shown in the drawings are commonly employed on the tires of traction-wheels, and are secured to the tread of the tire at desired intervals around the periphery. I have shown in Fig. 1 only a portion of the tread surface of a tire 1 to which are attached lugs 2 adapted to penetrate the soil to increase the holding power of the wheel thereon. The lugs 2 may be secured to the tire 1 in any suitable way, I prefer the way shown however, in which a bolt 3 is employed the lug being cast around it.

The lugs 2 are usually mounted on the tire 1 in pairs, one near either side of the tread; in the under face of each lug is a groove or recess 4 adapted to receive an end of a link of a section of chain 5 extending from one lug to the other and flexible between them. The groove 4 is so situated as to form, between it and the edge of the lug 2, a stud or projection 7 which is adapted to engage with a link of the chain 5.

In mounting my device on the tire 1 the end of a link of the chain 5, is placed in the groove 4, the bolt 3 is then passed through an opening in the tread and a nut 6 is employed to draw the lug 2 firmly against the tire, the stud or projection 7 passing through the link of the chain 5 engaging with the groove 4, thus securely holding one end of the chain 5 to the tire, the other end being secured in a similar manner by the second lug. It is obvious that the lugs and chains can be readily detached by removing the nuts on the bolts.

What I claim is—

1. An anti-slipping device for traction-wheels or the like, comprising lugs secured to the tire of a traction-wheel and adjacent the edges thereof, a groove in the base of each lug, and a chain section extending between the lugs and engaging with the grooves therein to secure said chain section on the tire.

2. An anti-slipping device for traction-wheels or the like, comprising lugs secured to the tire of a traction-wheel, a groove in the base of each lug forming a stud between said groove and the edge of the lug, said stud adopted to engage with a link of said chain section to secure the latter on the tire.

3. An anti-slipping device for traction-wheels or the like, comprising lugs secured to the tire of a traction-wheel adjacent the edges thereof, a groove in the base of each lug, and a flexible connection from one lug to another, and engaging with said grooves to secure said connection on the tire.

In testimony whereof I affix my signature, in presence of two witnesses.

CHARLES H. MELVIN.

Witnesses:
MARTIN PETERSON,
W. G. DUFFIELD.

Copies of this patent may be obtained for five cents each, by addressing the "Commissioner of Patents, Washington, D. C."